No. 892,229. PATENTED JUNE 30, 1908.
R. E. DAVIS.
MEANS FOR LOCKING NUTS TO BOLTS OR STUDS.
APPLICATION FILED MAR. 18, 1907.
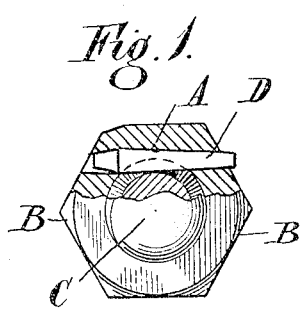
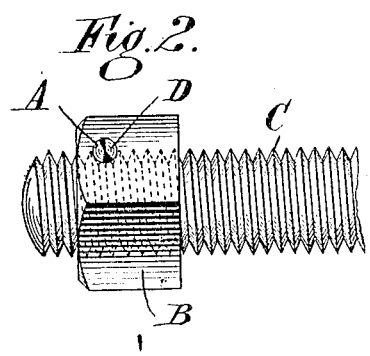
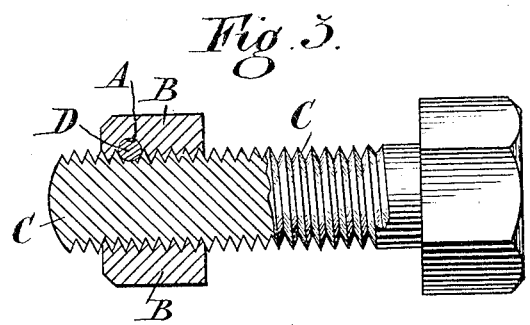
Witnesses:
Inventor
Richard E. Davis
By
James L. Norris
Atty

UNITED STATES PATENT OFFICE.

RICHARD EDWIN DAVIS, OF CLAPHAM, LONDON, ENGLAND.

MEANS FOR LOCKING NUTS TO BOLTS OR STUDS.

No. 892,229.        Specification of Letters Patent.        Patented June 30, 1908.

Application filed March 18, 1907. Serial No. 363,028.

*To all whom it may concern:*

Be it known that I, RICHARD EDWIN DAVIS, a subject of the King of Great Britain, residing at 23 Solon New Road, Bedford Road, Clapham, London, England, have invented certain new and useful Improvements in Means for Locking Nuts to Bolts or Studs, of which the following is a specification.

This invention relates to means for locking nuts to bolts, and the object of this invention is to provide means for positively locking nuts to bolts or studs in any position, by fastening a locking key within the nut in such a manner that no amount of vibration will move it.

My invention will be clearly understood from the following description aided by the accompanying drawings in which:—

Figure 1. is a part sectional end view of the nut and the bolt or stud. Fig. 2. is a side elevation of same. Fig. 3. is a part sectional elevation of a bolt and nut.

For the purpose of my invention, I drill or form a slightly tapered hole or holes A across the nut D, such hole A being positioned that it takes away part of the screw thread of the nut B and also forms a recess in the nut B at that part, that is to say, the width of the hole A is about double the depth of the screw thread of the nut, and the hole extends from the inner edge of the screw thread into the body of the nut B. After the nut B has been tightened up on the bolt or stud C, I drive into this hole an oppositely tapered key or pin D, the forward end of which may be flat, this end cutting into and ejecting the portion of the screw thread of the bolt or stem C with which it comes in contact without in any way cutting into the bolt C proper. The other end of the pin D is slightly tapered or shaped so that when the pin is driven fully home, a blow on the side of the nut D next the hole A closes the metal slightly on to the pin D, and sufficiently to retain the pin B in the hole A (due to the opposite tapers without fear of its becoming loose during any amount of vibration). To remove the pin D, all that is necessary is to punch it out from its cutting end.

For convenience sake, I drill one hole through the nut as above described, and at right angles to this I may drill another similar hole above the first, so that whichever position the nut shall be in when fixed, the hole shall be in a suitable position to drive the pin into the nut.

What I claim and desire to secure by Letters Patent is:—

1. The combination of a bolt, a nut on said bolt, having a key-receiving hole tangential to the bolt hole thereof, and a locking key having opposite tapers, fitted into said key-receiving hole, the stock of the nut being displaced against one of the tapered portions of the key.

2. The combination of a bolt, a nut on said bolt, having a key-receiving hole extending entirely across the same and tangential to the bolt hole thereof, and a locking key fitted in said key-receiving hole, said locking key having forwardly and rearwardly extending opposite tapered portions, said key fitting tightly in said key-receiving hole, the stock of the nut being displaced against the rear tapered portion of the key, and a portion of the thread of the bolt being removed by the key.

3. The combination of a bolt, a nut on said bolt having a tapered key-receiving hole tangential to the bolt-hole thereof, and a locking key having opposite tapers fitted into said key-receiving hole, the stock of the nut being displaced against the rear tapered portion of the key and the latter having a cutting portion to cut through the thread of the bolt.

In testimony whereof I have hereunto set my hand in presence of two subscribing witnesses.

RICHARD EDWIN DAVIS.

Witnesses:
    WM. O. BROWN,
    HUGH HUGHES.